United States Patent
Damhuis

(10) Patent No.: US 10,433,573 B2
(45) Date of Patent: Oct. 8, 2019

(54) RETORT FLUID SUCTION SYSTEM

(71) Applicant: John Bean Technologies Corporation, Chicago, IL (US)

(72) Inventor: Eduard Hendrikus Johannes Damhuis, Bousval (BE)

(73) Assignee: John Bean Technologies Corporation, Chicago, IL (US)

(*) Notice: Subject to any disclaimer, the term of this patent is extended or adjusted under 35 U.S.C. 154(b) by 839 days.

(21) Appl. No.: 15/014,748

(22) Filed: Feb. 3, 2016

(65) Prior Publication Data
US 2017/0215459 A1   Aug. 3, 2017

(51) Int. Cl.
  A23L 3/10   (2006.01)
  A23L 3/12   (2006.01)

(52) U.S. Cl.
  CPC .................. *A23L 3/10* (2013.01); *A23L 3/12* (2013.01); *A23V 2002/00* (2013.01)

(58) Field of Classification Search
  CPC .......... A23L 3/10; A23L 3/12; A23V 2002/00
  USPC .................. 99/483, 330, 354–360, 361–371, 99/403–404, 409, 516, 443 C, 534, 536, 99/477, 478, 467–470, 359, 366, 99/370–371, 403–404, 467–470, 275, 99/468, 473–476, 486, 487, 453, 362; 426/232, 405, 407, 412, 397, 521; 422/25, 105, 114, 302, 304; 21/2, 78, 93, 21/99, 103, 104, 79, 80, 86, 91, 92, 94, 21/97, 98
  See application file for complete search history.

(56) References Cited

U.S. PATENT DOCUMENTS

| | | | |
|---|---|---|---|
| 3,403,030 A * | 9/1968 | Pontecorvo | A01J 25/008 426/506 |
| 4,097,235 A | 6/1978 | Stock | |
| 4,591,463 A * | 5/1986 | Nahra | A23C 3/0375 261/116 |
| 6,301,905 B1 * | 10/2001 | Gallus | A23L 3/022 426/405 |
| 7,017,279 B2 * | 3/2006 | Almi | D21F 5/18 34/114 |
| 2010/0116214 A1 * | 5/2010 | Schumacher | A01K 7/06 119/73 |

(Continued)

OTHER PUBLICATIONS

Second Written Opinion dated Jan. 22, 2018, issued in corresponding International Application No. PCT/US2017/013854, filed Jan. 18, 2017, 5 pages.

(Continued)

*Primary Examiner* — Dana Ross
*Assistant Examiner* — Ket D Dang
(74) *Attorney, Agent, or Firm* — Christensen, O'Connor, Johnson, Kindness PLLC

(57) ABSTRACT

A fluid suction system for a retort having a vessel with a vessel length, pooled fluid at a bottom of the vessel defining a fluid surface level, and an outlet placing the vessel in fluid communication with a pump includes an elongated manifold for placement along the bottom of the vessel in fluid communication with the outlet. The pooled fluid flows into and through the manifold when the pooled fluid is suctioned by the pump, and the fluid surface level of the pooled fluid remains substantially even along at least a portion of the vessel length as the pooled fluid is suctioned by the pump.

14 Claims, 15 Drawing Sheets

(56) References Cited

U.S. PATENT DOCUMENTS

2011/0200730 A1    8/2011  Lewis et al.
2013/0071546 A1*   3/2013  Tomoda .................... A23L 3/10
                                                        426/643

OTHER PUBLICATIONS

International Search Report and Written Opinion dated Apr. 6, 2017, issued in corresponding International Application No. PCT/US2017/013854, filed Jan. 18, 2017, 11 pages.

* cited by examiner

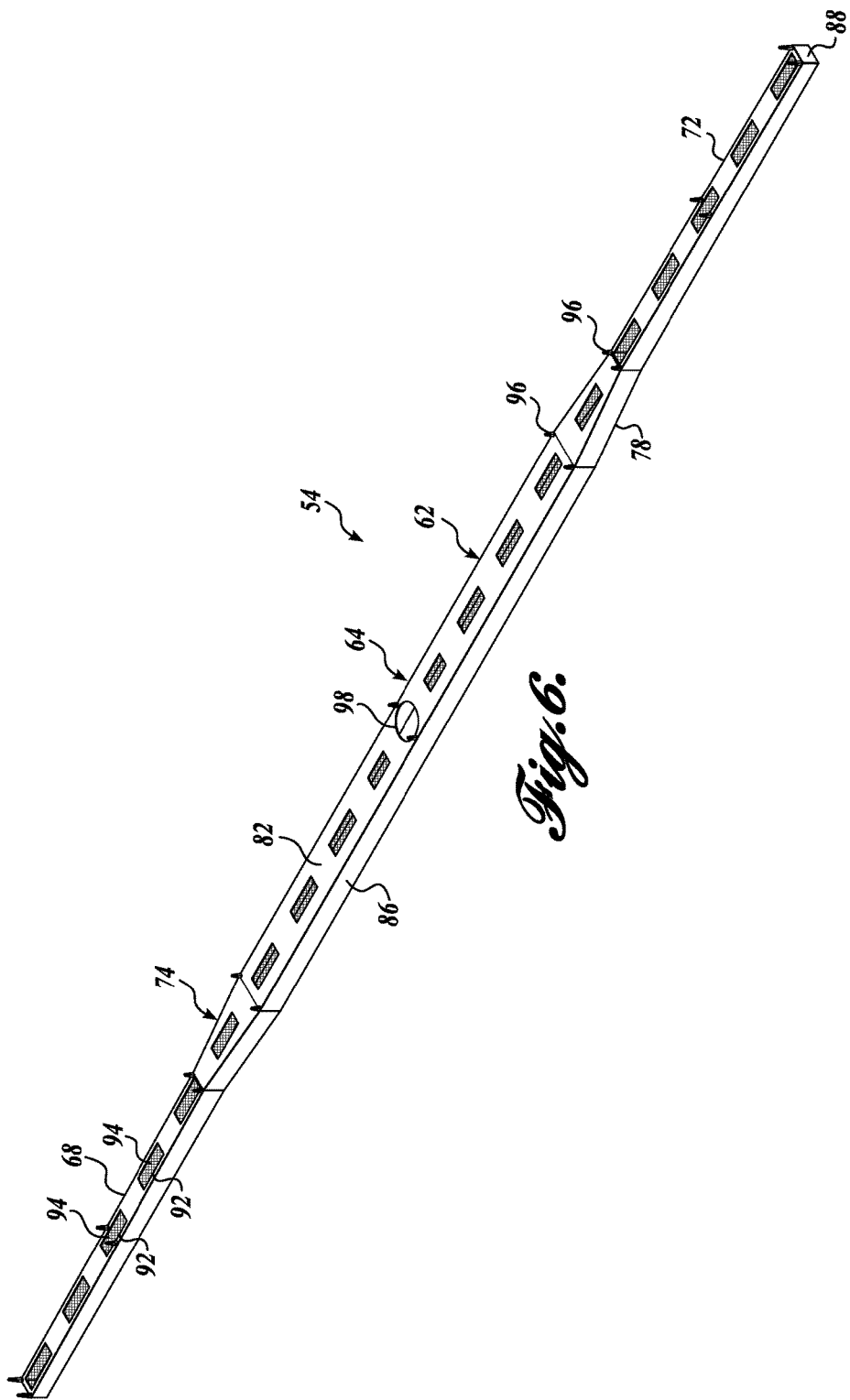

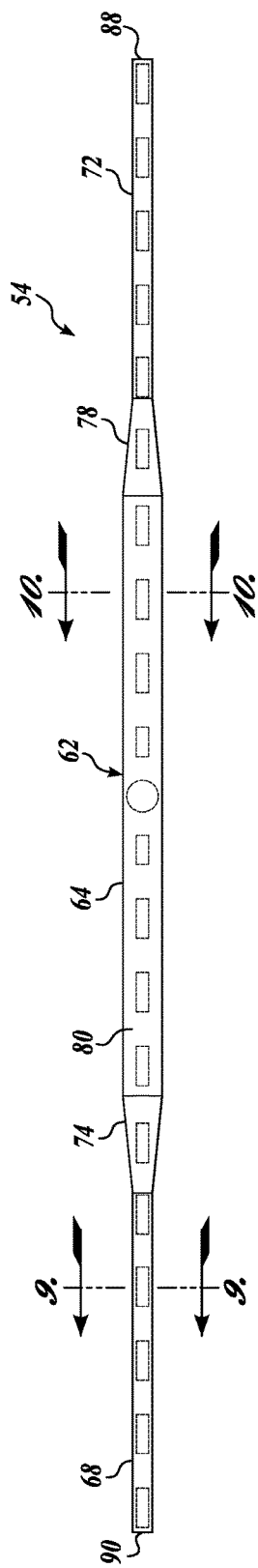
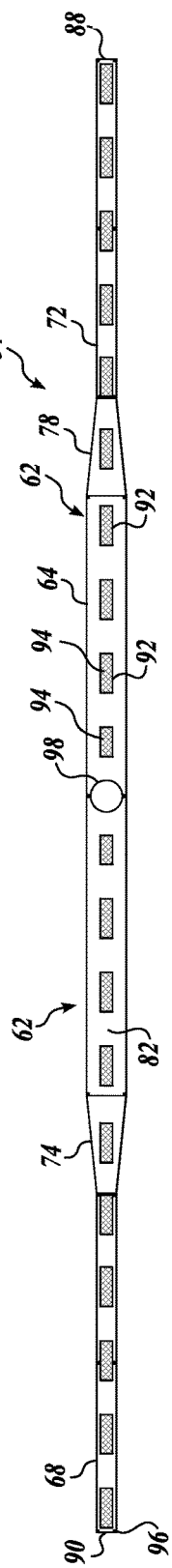
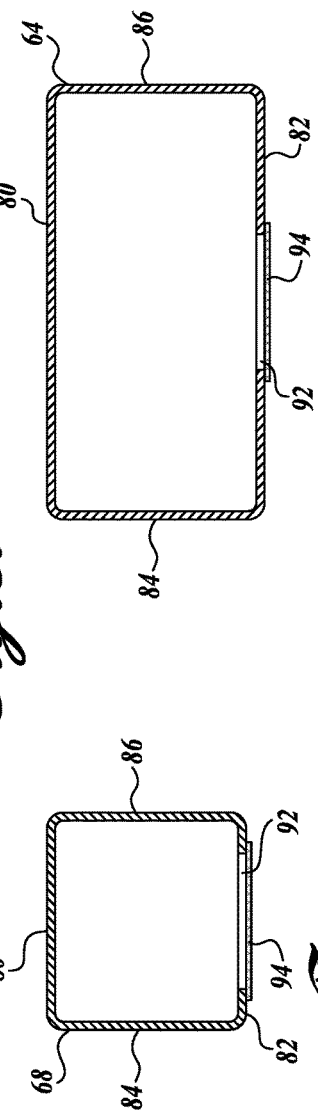

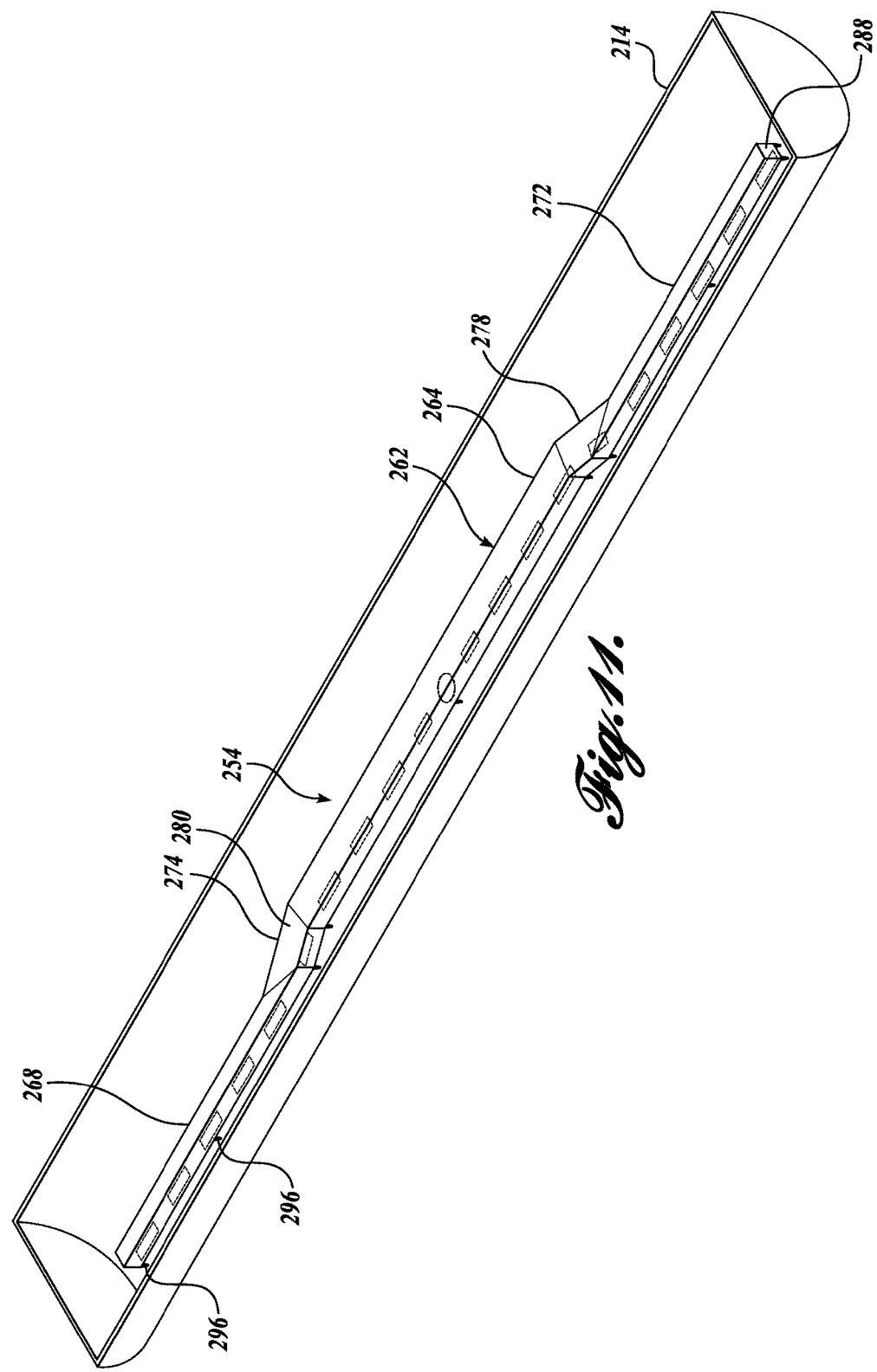

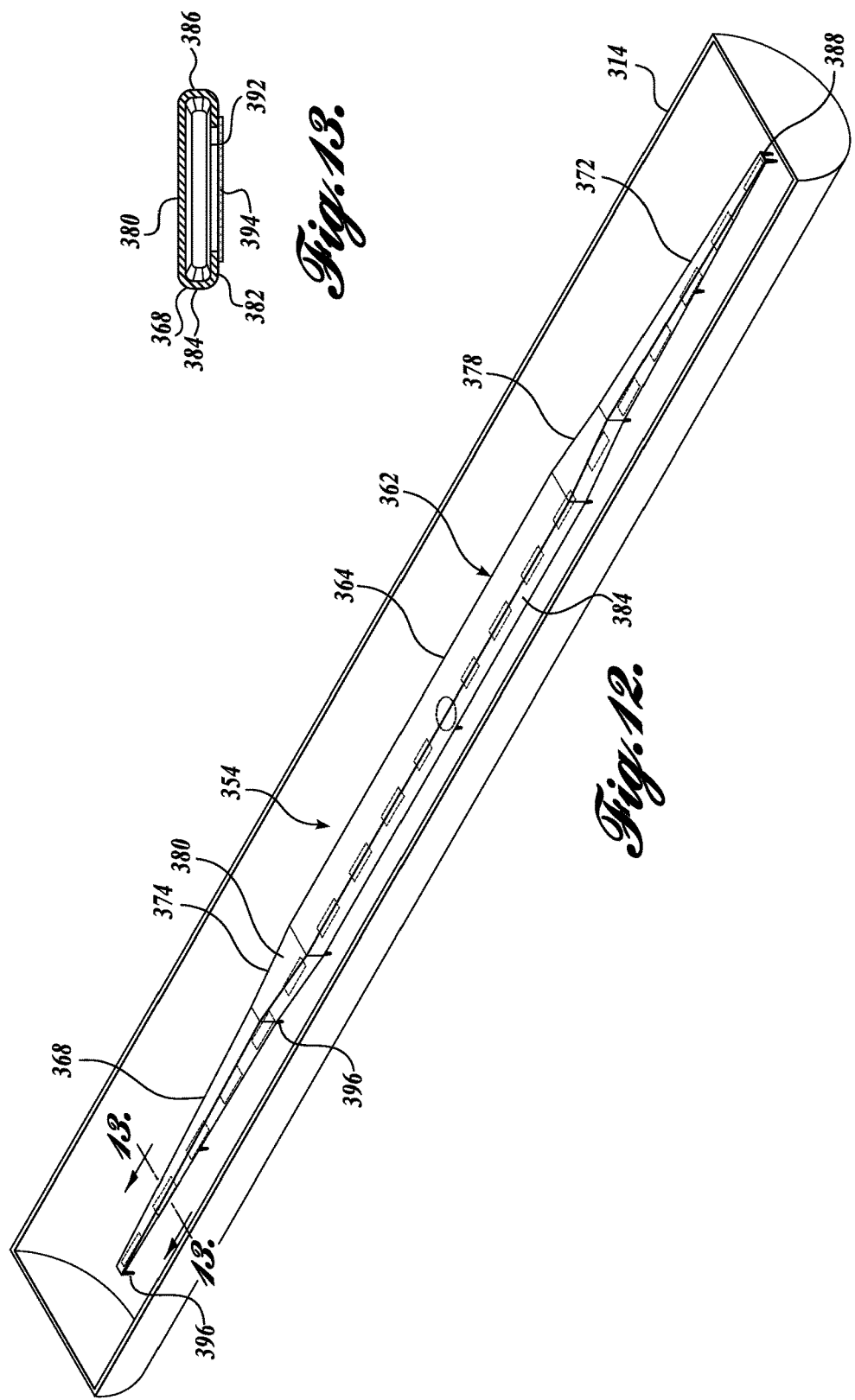

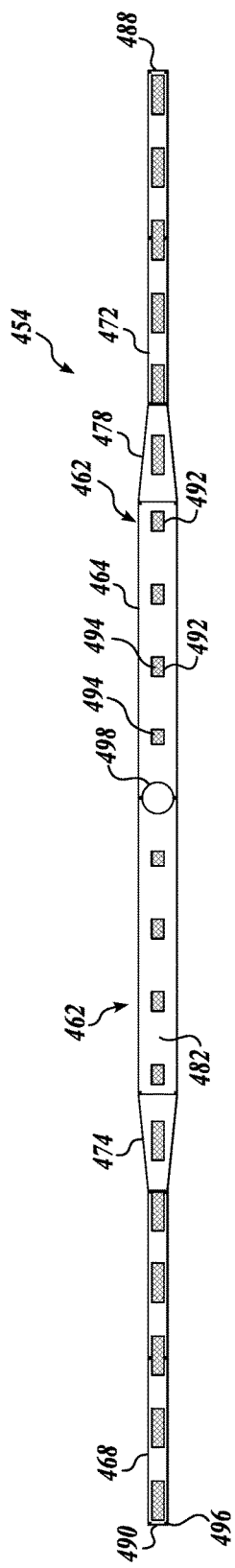

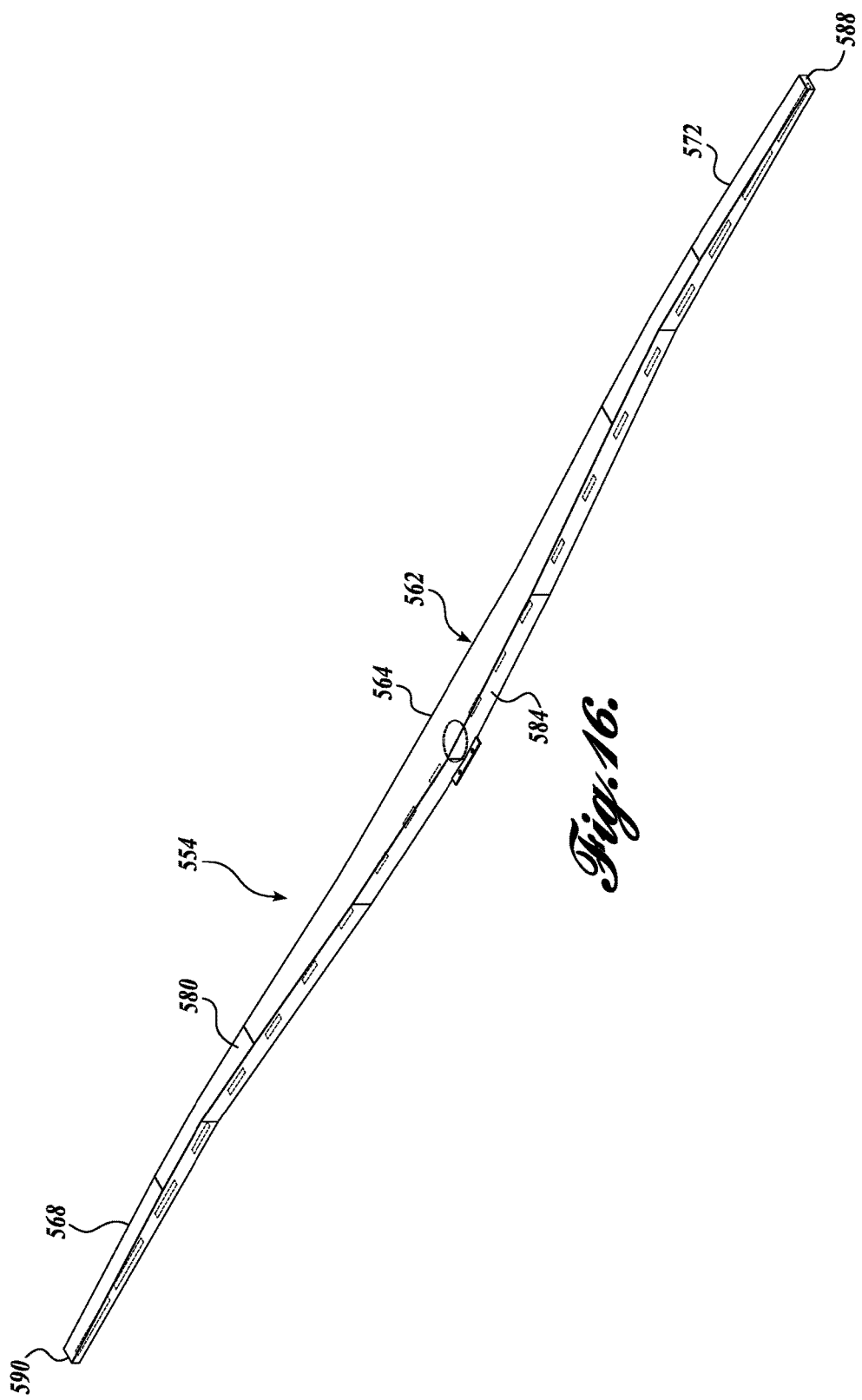

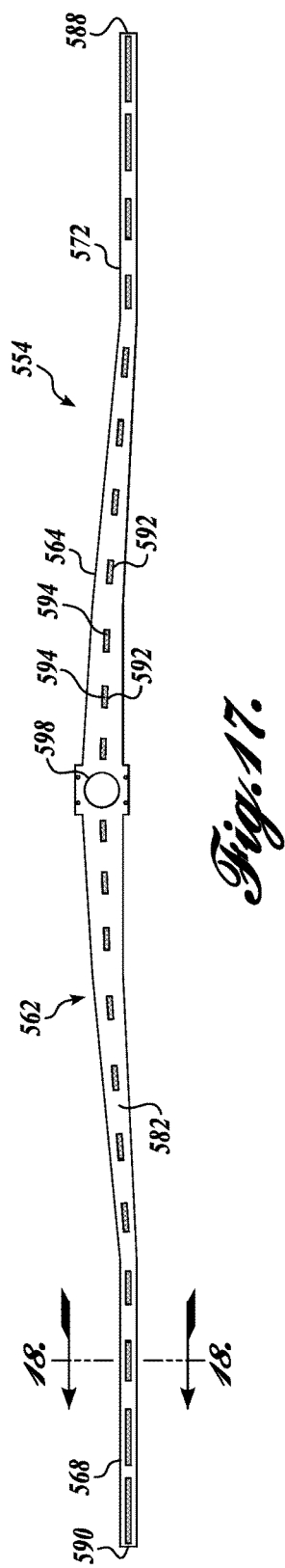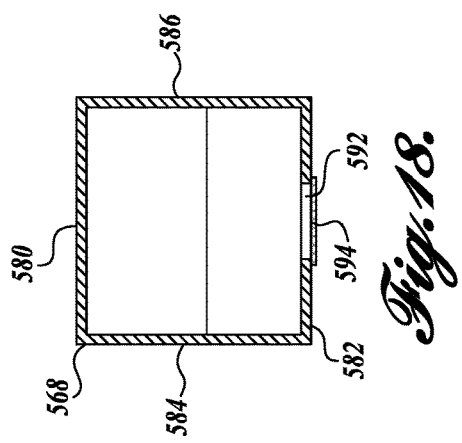

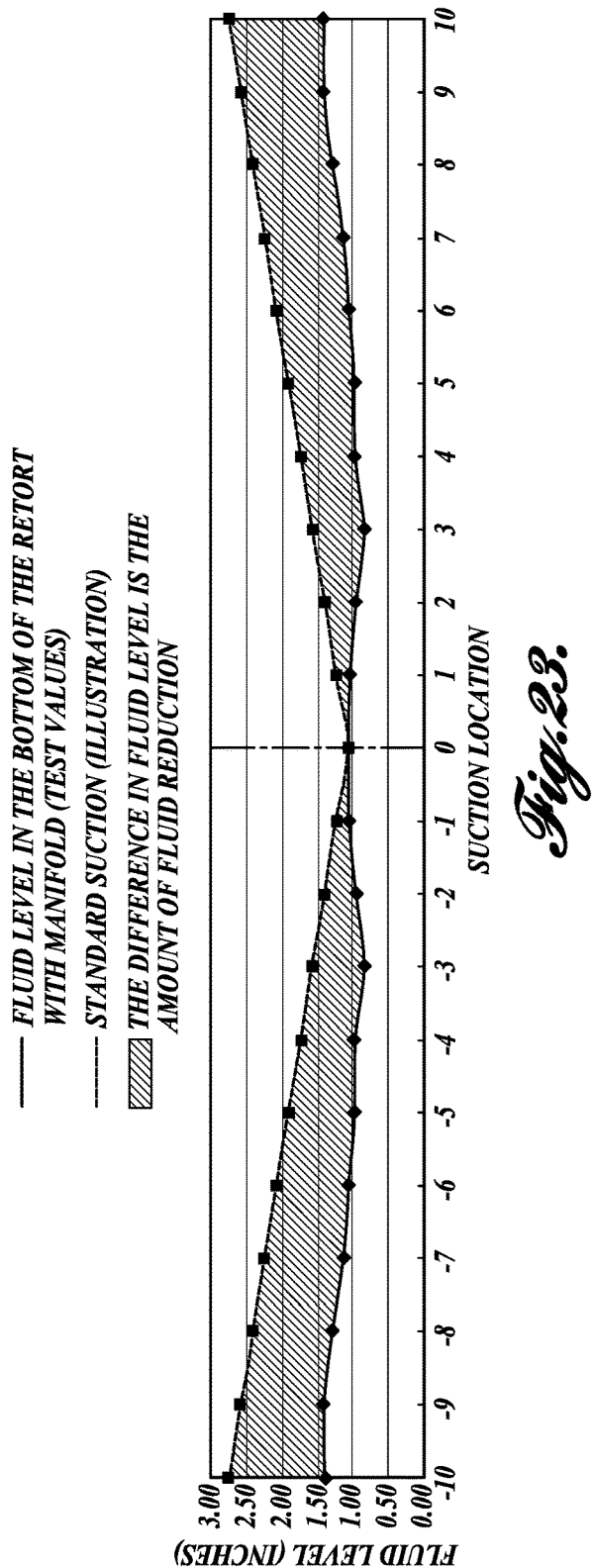

RETORT FLUID SUCTION SYSTEM

BACKGROUND

Retorts are used for the in-container preservation of foodstuffs, either for pasteurization or sterilization processes. In general, these machines use a combination of pressure and temperature to process packaged food according to a predefined schedule. Additional overpressure for pasteurizing or sterilizing certain containers of foodstuffs may be achieved in a spray retort, where water or another suitable processing fluid is sprayed from the top (and optionally also from the sides) of the vessel through the load of containers. The processing fluid is used as a media for transferring heat into and out of the food containers during the sterilization process. The processing fluid may be heated through external means, or alternatively steam may be directly injected into the vessel.

As can be appreciated, using water or another fluid ("processing fluid") continuously in this manner adds thermal mass to the process cycle and requires heating and cooling energy above that which is required by the food containers themselves. For instance, every cycle the processing fluid must be heated from ambient temperature up to about 121° C. (approximately 250° F.) and pressurized (for the steam to reach that temperature). Thus, reducing the quantity of processing fluid required for the spray retort process reduces the quantity of energy and fluid utilities consumed per process cycle (i.e., steam consumption). In other words, a lower volume of processing fluid needs to be heated and cooled every cycle. A reduction in the quantity of energy and fluid utilities consumed per process cycle results in a lower cost per container for the process cycle.

However, the reduction in the retort fluid level or volume is limited by the ability of the retort pump to circulate a relatively constant volume of processing fluid at a substantially high, selected flow rate (which may be defined by the velocity of the fluid exiting the retort). The selected flow rate will depend on various factors, such as the size of the load inside the retort, the diameter of the retort, whether the retort is in the cook or cool process, and other factors. As non-limiting examples, a 6 basket 1400 mm diameter retort during the cool process may have a flow rate of around at least 700 gallons per minute (gpm) through the retort outlet. A 6 basket 1800 mm diameter retort during the cook process may have a flow rate of around 1500 gpm through the retort outlet. Larger retorts, larger loads inside the retorts, and other factors would require more flow within the retort. Thus, although the flow rates of a retort will vary, it can be appreciated that the flow rate required or selected within a retort is significantly higher than what gravity would otherwise provide to remove the fluid from the bottom of the retort.

The processing fluid at the bottom of the retort is drawn to the suction side of the pump at the selected flow rate from one or more openings (i.e., suction points) in the bottom of the retort. While the pump is circulating the suctioned fluid at the selected high flow rate, the level of fluid remaining within the retort is reduced at the suction points, and the fluid level remains higher further away from the suction points. As a result of this fluid level gradient, the initial processing fluid fill level (i.e., volume) in the retort prior to starting the pump must be sufficiently high (or at a minimum level) such that the processing fluid level above the suction points does not cause air or steam entrainment or cavitation of the pump, which would lead to significant loss of pump flow.

As an example, FIG. 1 depicts a first prior art retort 20 having a single opening or suction point 24. When the pump (not shown) is started and the processing fluid inside the retort is removed at the selected flow rate, the fluid level above the suction point 24 lowers relative to the fluid level at the ends of the retort 20. This significant fluid level gradient is created naturally by the processing fluid as it tries to return to a natural level. More specifically, the processing fluid at the high ends has more potential energy than the lower processing fluid near the suction point 24, and as a result, a flow of processing fluid goes from high to low. When all points along the fluid surface have the same potential energy, the surface is level and flow stops. With continual removal and replacement of processing fluid at the same high flow rate, however, the natural levelling does not occur and the gradient becomes essentially constant.

As more suction points 24 are added, as shown in the second prior art retort 30 of FIG. 2, the resulting significant gradients combine to create peaks and valleys, similar to a sine wave pattern. The frequency of the wave increases as more suction points are added, but the amplitude decreases because the flow rate is divided across the suction points. It can be appreciated that as the number of suction points approaches infinity, the amplitude will approach zero. In other words, the more suction points there are along the retort vessel, the more closely the fluid surface approximates a constant, even level. However, it is not practical to manufacture a retort vessel with such a large number of suction pipes to make the fluid surface level or even.

Previous attempts to minimize processing fluid volume and avoid pump cavitation or entrainment have been focused only on adding deflectors or diffuser geometries around the opening of the pipe. While such prior art designs have helped distribute the processing fluid at higher fluid volumes, they have not been sufficient to achieve a significantly lower volume of processing fluid within the retort.

Accordingly, a design that minimizes suction points while distributing the selected processing fluid suction flow (and therefore the processing fluid level) substantially evenly along the length of at least a portion of the retort is needed. Such a design would reduce or eliminate the significant gradient effect caused in prior art systems, allowing the processing fluid to be reduced to the minimum volume required to operate the retort spray process at the selected flow rate.

SUMMARY

A fluid suction system for a retort having a vessel with a vessel length, pooled fluid at a bottom of the vessel defining a fluid surface level, and an outlet placing the vessel in fluid communication with a pump includes an elongated manifold for placement along the bottom of the vessel in fluid communication with the outlet. The pooled fluid flows into and through the manifold when the pooled fluid is suctioned by the pump, and the fluid surface level of the pooled fluid remains substantially even along at least a portion of the vessel length as the pooled fluid is suctioned by the pump.

A fluid retort system includes a vessel with a vessel length, pooled fluid at a bottom of the vessel defining a fluid surface level, an outlet placing the vessel in fluid communication with a pump, and a fluid suction system. The fluid suction system includes an elongated manifold configured for placement along the bottom of the vessel in fluid communication with the outlet. The pooled fluid flows into and through the manifold when the pooled fluid is suctioned by the pump, and the fluid surface level of the pooled fluid remains substantially even along a least a portion of the vessel length as the pooled fluid is suctioned by the pump.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 6 is a bottom isometric view of the fluid suction system of FIG. 5;

FIG. 7 is a top view of the fluid suction system of FIG. 5;

FIG. 8 is a bottom view of the fluid suction system of FIG. 5;

FIG. 9 is a cross-sectional view of the fluid suction system of FIG. 7, taken substantially across line 9-9;

FIG. 10 is a cross-sectional view of the fluid suction system of FIG. 7, taken substantially across line 10-10;

FIG. 11 is a top isometric view of a fluid suction system formed in accordance with a second exemplary embodiment of the present disclosure, wherein the fluid suction system is shown in a bottom half of a retort, and wherein internal structure of the retort is removed for clarity;

FIG. 12 is a top isometric view of a fluid suction system formed in accordance with a third exemplary embodiment of the present disclosure, wherein the fluid suction system is shown in a bottom half of a retort, and wherein internal structure of the retort is removed for clarity;

FIG. 13 is a cross-sectional view of the fluid suction system of FIG. 12, taken substantially across line 13-13;

FIG. 15 is a bottom view of the fluid suction system of FIG. 14;

FIG. 16 is a top isometric view of a fluid suction system formed in accordance with a fifth exemplary embodiment of the present disclosure, wherein the fluid suction system is shown in a bottom half of a retort, and wherein internal structure of the retort is removed for clarity;

FIG. 17 is a bottom view of the fluid suction system of FIG. 16;

FIG. 18 is a cross-sectional view of the fluid suction system of FIG. 17, taken substantially across line 18-18;

FIG. 23 is a graphical depiction of the fluid level having a fluid suction system formed in accordance with the exemplary embodiment of FIG. 22 compared to the fluid level of a prior art suction system.

DETAILED DESCRIPTION

Figure 1:
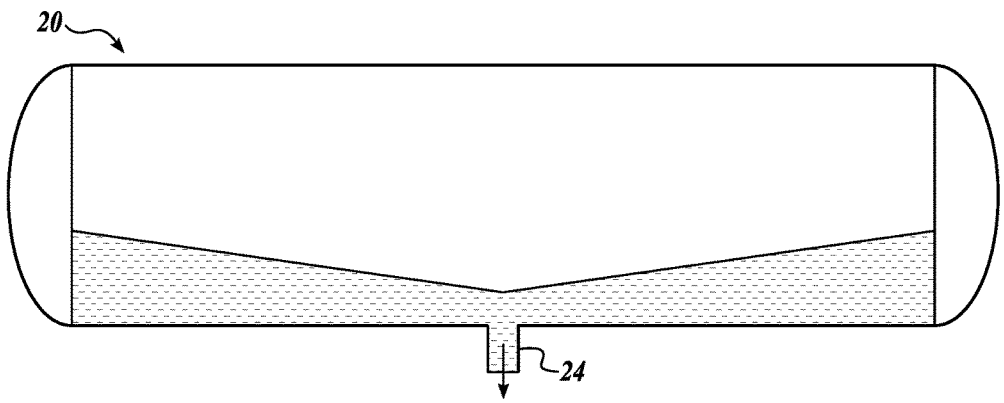
FIG. 1 is a schematic view of a first prior art retort having a single suction point and having a first significant gradient effect.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known structures or process steps have not been described in detail in order not to unnecessarily obscure various aspects of the present disclosure. Further, it will be appreciated that embodiments of the present disclosure may employ any combination of features described herein.

The present disclosure includes references to directions, such as "forward," "rearward," "upward," "downward," "vertical," "horizontal," "above," "below," etc. These references and other similar references in the present disclosure are only to assist in helping describe and understand the present invention and are not intended to limit the present invention to these directions.

The present application may also include modifiers, such as the words "generally," "approximately" or "substantially." These terms are meant to serve as modifiers to indicate that the "dimension," "shape," or other physical parameter or specification in question need not be exact, but may vary as long as the function that is required to be performed can be carried out. For example, in the phrase "substantially rectangular in shape," the shape need not be exactly rectangular as long as the required function of the structure or process in question can be carried out. As another example, in the phrases "a substantially flat surface level," "a substantially even surface level," or similar, the surface in question need not be exactly flat or even, but rather sufficiently flat or even that required function or requirement of the system can be achieved.

Also, the present disclosure describes a fluid suction system for a retort. However, it should be appreciated that the suction system may be used with any suitable fluid or liquid and in any type of retort or other system. For instance, the fluid suction system may be used for water, steam, a combination of water and steam, and other fluids. Accordingly, the fluid suction system will be hereinafter described with reference to a "fluid," "processing fluid," or similar, which are understood to be interchangeable and are not meant to be limiting in nature. Moreover, the terms "fluid," or "processing fluid" are meant to include any suitable fluid, such as water, steam, etc.

FIGS. 4-10 depict a fluid suction system 44 formed in accordance with a first exemplary embodiment of the present disclosure. FIGS. 11, 12-13, 14-15, 16-18, 19, 20, and 21 depict aspects of alternative exemplary embodiments of fluid suction systems formed in accordance with the present disclosure, wherein like parts as in FIGS. 4-10 are numbered in the '200, '300, '400, '500, '600, '700, and '800 series, respectively.

Figure 4:
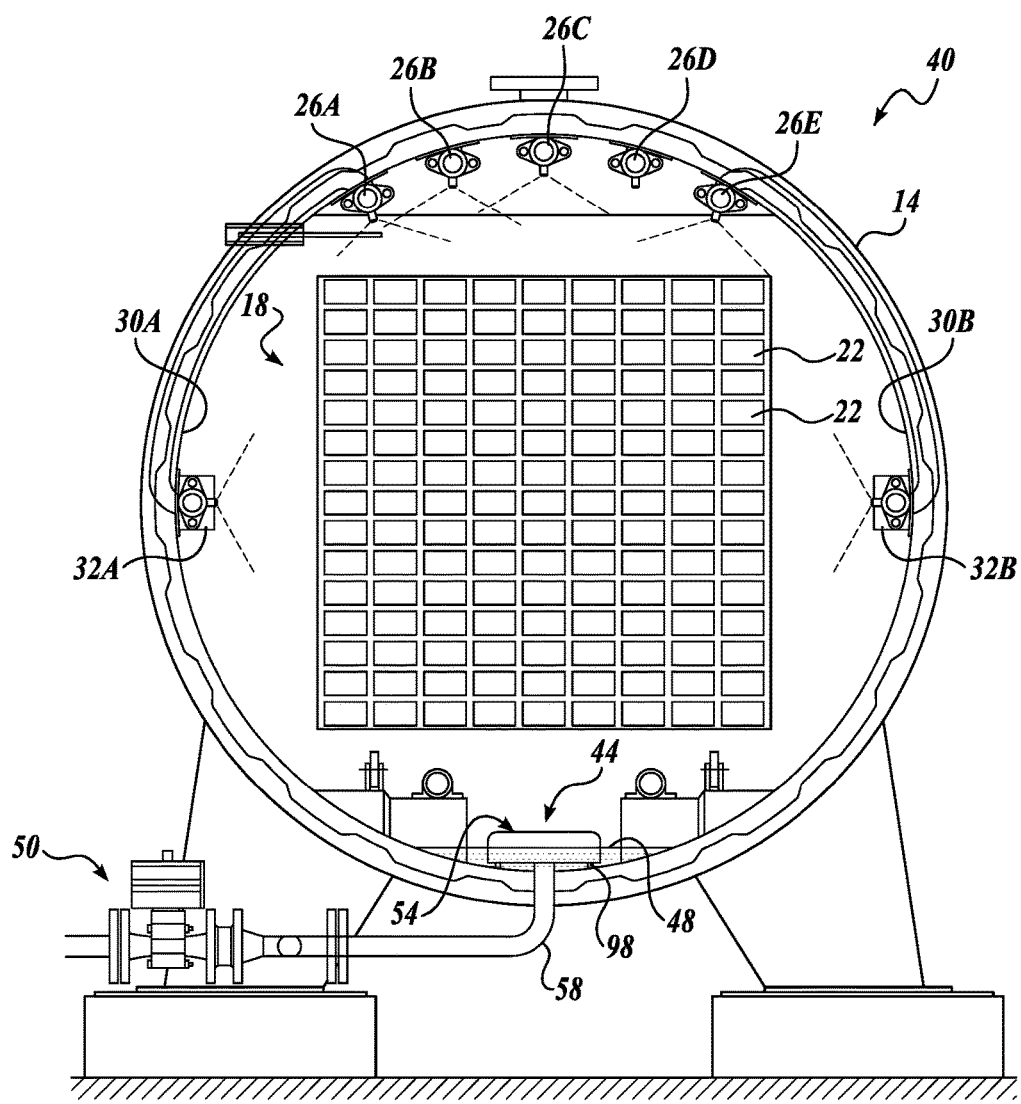
FIG. 4 is an open end view of a retort system having a fluid suction system formed in accordance with the first exemplary embodiment of the present disclosure.
Figure 5:
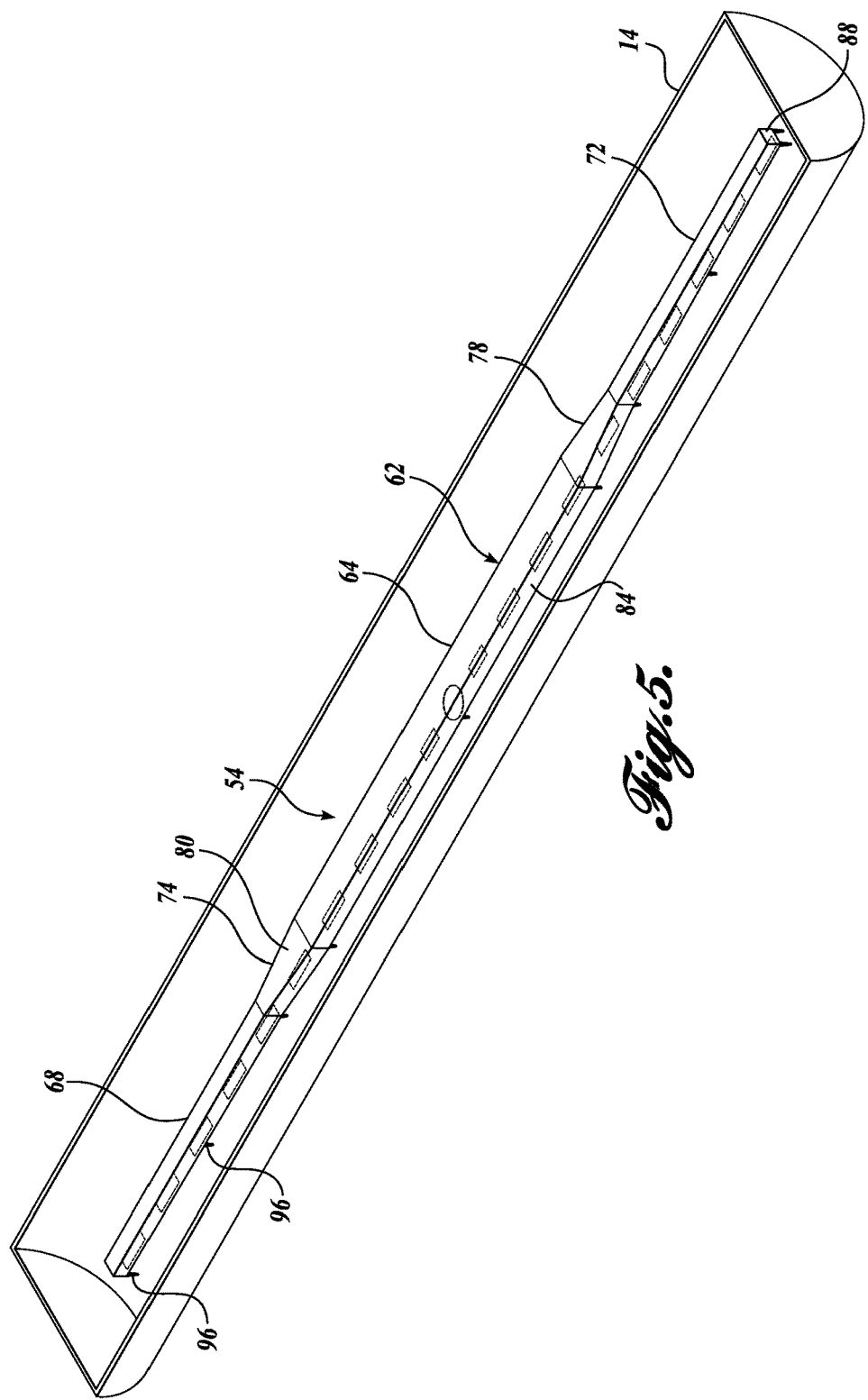
FIG. 5 is a top isometric view of the fluid suction system of FIG. 4, shown in a bottom half of a fluid retort, wherein internal structure of the fluid retort is removed for clarity.

Referring to FIG. 4, the fluid suction system 44 will now be described in detail. The fluid suction system 44 is shown in a retort system 40. The fluid suction system 44 may be used in any suitable retort system or other system; and therefore, the retort system 40 will only be briefly described. The retort system 40 includes a cylindrical pressure vessel 14 that houses a load 18 containing containers 22 or other devices or pieces to be sterilized. A plurality of top spray nozzles 26A-26E is located at the top interior of the vessel 14 and is angled to spray fluid onto the top of the load 18. First and second optional side spray nozzles 32A and 32B are located on interior opposing side portions 30A and 30B of the vessel 14 and are angled to spray fluid onto the side of the load 18. The fluid from the spray nozzles, after passing through the load 18, pools at the bottom interior of the vessel 14 to be recirculated by a pump system 50 at the selected flow rate.

As discussed in the Background section above, the selected flow rate will depend on various factors, such as the size of the load inside the retort, the diameter of the retort, whether the retort is in the cook or cool process, etc. For purposes of describing the fluid suction systems of the present disclosure, the flow rate of the pump system is sufficiently high such that in a prior art system (having about one to three openings in the bottom of the retort), a significant fluid level gradient would result, such as that shown in FIGS. 1 and 2.

The fluid suction system 44 is designed to suction a low or minimum volume of pooled fluid 48 at the bottom interior of the vessel 14 for recirculation within the retort without causing any air entrainment or cavitation within the pump (not labeled) at the selected flow rate. The fluid suction system 44 includes a manifold 54 that is in fluid communication with the pooled fluid 48 and a suction pipe 58. The pooled fluid 48 flows through the manifold 54 and thereafter into the suction pipe 58 to the pump system 50.

Referring to FIGS. 5-10, detailed aspects of the manifold 54 will now be described. The manifold 54 includes a body 62 that may be embodied as a pipe, duct, or other structure that is elongated and hollow and extends along a substantial length of the interior of the vessel 14. The body 62 is defined by an intermediate section 64, first and second opposing end sections 68 and 72, and first and second tapered transition sections 74 and 78 defined between the intermediate section 64 and the first and second opposing end sections 68 and 72, respectively. The intermediate section 64 is generally centered on the suction pipe 58 with the first and second end sections extending from the intermediate section 64 toward the first and second ends of the vessel 14.

In the depicted embodiment, the body 62 is generally rectangular or square in cross-section. As can be seen in FIGS. 9 and 10, the intermediate section 64 is generally rectangular in cross-sectional shape and the first end section 68 is generally square in cross-sectional shape. Moreover, the height of the intermediate section 64 is generally larger than or at least equivalent to the height of the first end section 68, but the width of the intermediate section 64 is about twice as wide as the first end section 68. The second end section 72 is substantially identical in cross-sectional shape and size to the first end section 68.

The transition sections 74 and 78 change from substantially rectangular in cross-section like the intermediate section 64, to substantially square in cross-section, like the first and second end sections 68 and 72, as the transition sections 74 and 78 extend from the intermediate section 64 toward the first and second end sections 68 and 72. Moreover, the transition sections 74 and 78 change from a first height equal to the height of the intermediate section 64 to a second smaller height equal to the first and second end sections 68 and 72.

In an alternative embodiment shown in FIG. 11, wherein like parts are numbered with like numerals as in FIGS. 4-10, but in the '200 series, the manifold 254 includes transition sections 274 and 278 that not only transition from the first cross-sectional shape and size of the intermediate section 264 to the second cross-sectional shape and size of the first and second end sections 268 and 272, but also change direction as they extend between the intermediate section 264 and the first and second end sections 268 and 272. In this alternative embodiment, it can be seen that the transition sections 274 and 278 can be used to change the elongated shape of the manifold 254 to accommodate any interior parts or geometry of the vessel 214 (not shown).

It should be appreciated that in any embodiment, the transition sections 74 and 78 (and 274 and 278) may be eliminated, and the body 62 may instead gradually taper in size and gradually change in shape (and direction if needed) as it extends from the intermediate section 64 to the first and second end sections 68 and 72. Any bend or change in the geometry of the body 62 can lead to friction loss and pressure drop changes, complicating fluid flow within the manifold 54. Accordingly, it can be appreciated that a body 62 having a simple, streamlined geometry would be beneficial in maintaining a substantially even flow of processing fluid into the manifold 54.

For example, in the alternative embodiment shown in FIG. 16, wherein like parts are numbered as in FIG. 4-10 except in the '500 series, the body 562 gradually tapers in height and width as it extends from an intermediate section 564 to first and second end sections 568 and 572. The body 562 also gradually changes in direction (i.e., it is not linear) to accommodate internal structure of the vessel (not shown). As such, the manifold 564 does not include transition sections, as in the embodiments of FIGS. 5-10 11, 12, and 14-15.

Referring back to FIGS. 5-10, the body 62 is substantially rectangular or square in cross section, and as such, the body 62 includes a top surface 80, a bottom surface 82 opposite the top surface 80, a first side surface 84, a second side surface 86 opposite the first side surface 84, a first end surface 88, and a second end surface 90 opposite the first end surface 88. The surfaces 80, 82, 84, 86, 88, and 90 together define the enclosed, elongated hollow body 62.

Although the body 62 is shown and described as being substantially rectangular and square in cross-sectional shape at the middle and end sections 64 and 68/72, respectively, the body may instead be any other suitable cross-sectional shape. It has been found by the inventors that when the overall cross-sectional size of the body 62 in the intermediate section 64 is larger than the overall cross-sectional size of the body 62 in the first and second end sections 68 and 72, the pressure drop across the length of the manifold 54 becomes more even, leading to a more even flow of processing fluid into the manifold 54. Thus, it should be appreciated that the body 62 may instead be any suitable cross-sectional shape in the middle and/or end sections 64 and 68/72 to create this substantially even pressure drop effect along the length of the manifold 54.

To allow pooled processing fluid to flow into the manifold 54, at least one, and preferably a plurality of suction openings 92 are disposed in the body 62 (only some suction openings 92 labeled). The suction openings 92 are formed in the body 62 such that they are in fluid communication with the pooled processing fluid, and they are configured to help distribute the fluid suction flow (and therefore the fluid level) substantially evenly along the length of the vessel 14.

In the depicted embodiment, the body 62 includes a plurality of suction openings 92 defined along the length of the bottom surface 82. In this manner, the pooled processing fluid will be in fluid communication with the suction openings 92 even when the fluid level is below the top surface 80 of the manifold 54. In that regard, a plurality of legs 96 may extend from the bottom surface 82 of the body 62 to position the body 62 at least slightly above the bottom interior surface of the vessel 14 (see FIG. 4) such that fluid may flow into the suction openings 92. The body 62 may instead be offset from the bottom interior surface of the vessel 14 in any other suitable manner.

The suction openings 92 may instead be formed or may additionally be formed on any other suitable surface of the body 62. More specifically, the suction openings 92 may be formed in the first and second side surfaces 84 and 86, the first and second end surfaces 88 and 90, and/or the top surface 80 in addition to or in lieu of being formed in the bottom surface 82. The location of the suction openings 92 may depend on the cross-sectional shape and size of the body 62. For instance, a substantially wide and short body could include suction openings 92 on the top, side, and end surfaces since the top surface 80 of the manifold 54 could be below the (lowered) fluid level of the retort system 40. Thus, the suction openings 92 may be formed on any suitable surface of the selected body configuration.

Figure 19:
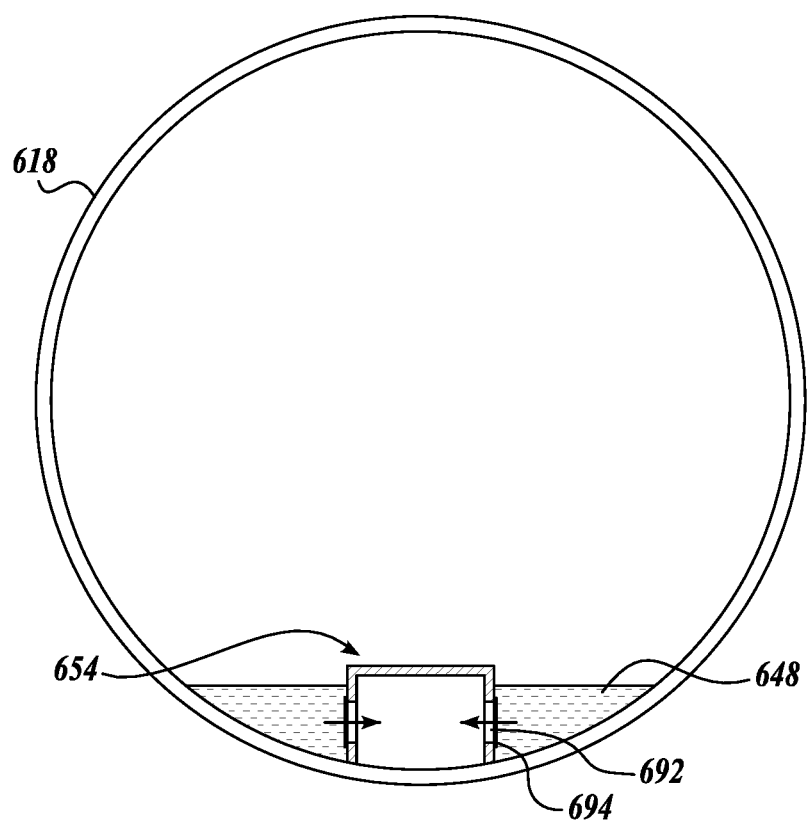
FIG. 19 is an open end view of a retort system having a fluid suction system formed in accordance with a sixth exemplary embodiment of the present disclosure.
Figure 20:
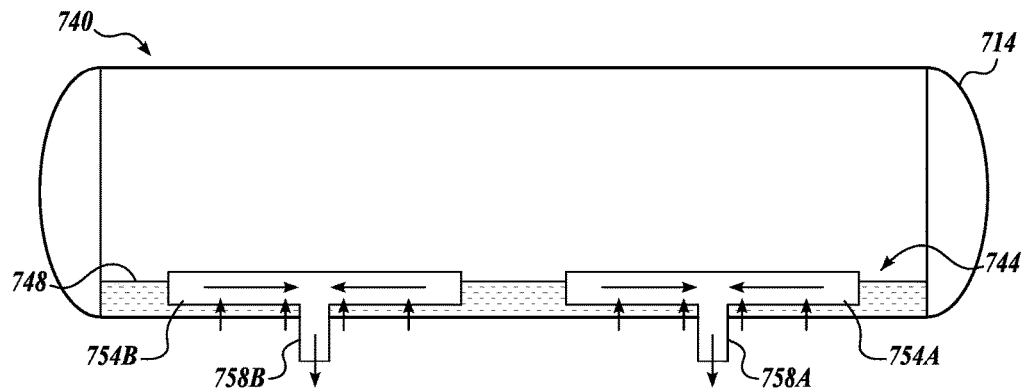
FIG. 20 is a schematic view of a fluid suction system formed in accordance with a seventh exemplary embodiment of the present disclosure, wherein the fluid level is substantially even along the length of the retort.
Figure 21:
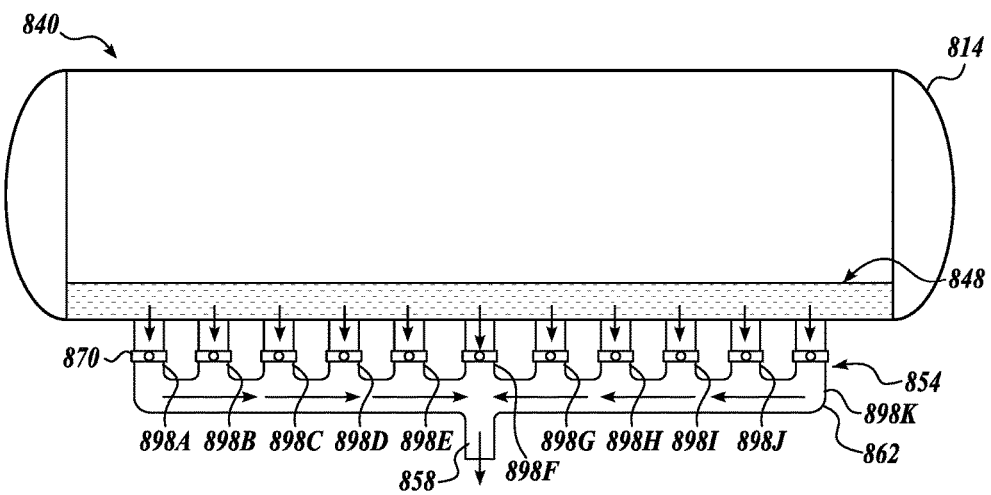
FIG. 21 is a schematic view of a fluid suction system formed in accordance with an eighth exemplary embodiment of the present disclosure, wherein the fluid level is substantially even along the length of the retort.

An exemplary alternate embodiment is shown in FIG. 19, wherein like parts have been numbered as in FIGS. 4-10, but with like reference numerals in the '600 series. In the embodiment of FIG. 19, the manifold 654 includes suction openings 692 (optionally covered by a filtering device 694, such as a screen) formed in side surfaces of the manifold body. With suction openings 692 in the side surfaces, the pooled fluid can flow into the sides of the manifold 654, as indicated by the arrows. In such a configuration, the pooled fluid does not have to be in communication with the bottom surface of the manifold 654, and as such, the manifold 654 may rest against or otherwise be disposed on the bottom interior surface of the vessel 618. In that regard, the bottom surface or bottom portion of the manifold 654 may be defined by the vessel itself. With the manifold 654 resting against the bottom interior surface of the vessel 618, the manifold 654 may be at a lower position within the vessel 618 in comparison to a manifold offset from the bottom interior surface of the vessel with legs or the like (as in FIGS. 4-10). Accordingly, the fluid level (i.e., volume) can remain substantially low while still reaching the suction openings 692 in the side surfaces of the manifold 654. The suction openings may instead be positioned on any other suitable surface of the manifold body.

Referring again to FIGS. 5-10, the suction openings 92 allow fluid to enter the body 62 of the manifold 54 and flow out of the manifold 54 through a central outlet opening 98 defined in the bottom surface 82 of the body 62. The fluid in the manifold 54 flows out the outlet opening 98 and into the suction pipe 58 for recirculation within the retort system 40 at the selected flow rate. The suction openings 92 and/or the outlet opening 98 may be covered by a perforated plate, mesh, screen, or other filtering device 94 to prevent any debris, such as broken glass or other fragments, from entering the pump system 50. Each filtering device 94 may also help distribute the flow of fluid through its covered suction opening 92. More specifically, the small openings defined in the filtering device 94 help distribute the pressure through the larger suction opening 92 to create a substantially even flow of fluid therethrough.

The suction openings 92 are of a predetermined size and are spaced apart in a predetermined pattern along the length of the body 62 to distribute the fluid suction flow (and therefore the fluid level) substantially evenly along the length of the vessel 14. Any suitable size and pattern of suction openings 92 may be used in the manifold 54 to distribute the fluid suction flow substantially evenly along the length of the vessel 14. The size and pattern of suction openings 92 will depend upon the shape and size of the manifold body in its intermediate section and end sections, the fluid flow rate through the manifold, and other factors.

For example, the suction openings 92 may be smaller in size or even eliminated near the central outlet opening 98. It can be appreciated that the pressure drop caused by the pump system 50 is greater near the central outlet opening 98. Thus, in a configuration having fewer or smaller suction openings 92 near the central outlet opening 98, the pooled fluid may be sucked into the manifold 54 through suction openings 92 in the first and second end sections 68 and 72 at substantially the same rate as through the suction openings 92 in the intermediate section 64 (nearer the central outlet opening 98).

Figure 14:
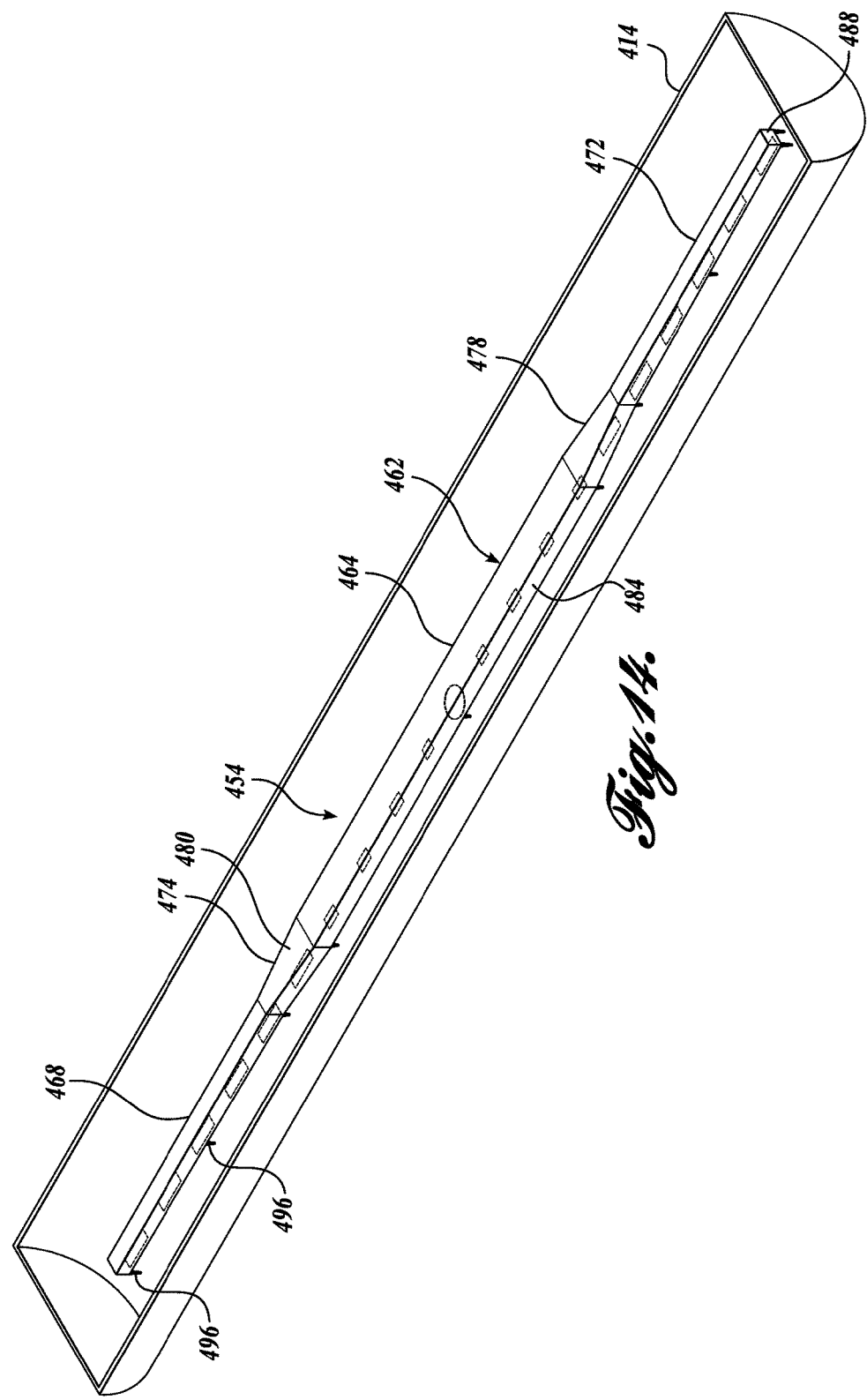
FIG. 14 is a top isometric view of a fluid suction system formed in accordance with a fourth exemplary embodiment of the present disclosure, wherein the fluid suction system is shown in a bottom half of a retort, and wherein internal structure of the retort is removed for clarity.

In the embodiments shown in FIGS. 5-10, 11, and 12, the two suction openings 92 nearest the central outlet opening 98 are shorter in length than the remaining suction openings 92, but the suction openings 98 are otherwise substantially the same width and are spaced apart substantially equally (from the outer edge of a first opening to the inner edge of the next opening). In the embodiment shown in FIGS. 14 and 15, the two suction openings 492 nearest the central outlet opening 498 are shorter in length than the remaining suction openings 492 in the intermediate section 464, and the suction openings 492 on the first and second end sections 468 and 472 (as well as the first and second tapered sections 474 and 478) are longer in length than all the openings in the intermediate section 464. The suction openings 492 in the embodiment shown in FIGS. 14 and 15 are all substantially the same width and are spaced apart substantially equally (from the center of a first opening to the center of the next opening) along the length of the manifold 454. In yet another configuration shown in FIGS. 16 and 17, all of the suction openings 592 are smaller in width in comparison to the suction openings shown in the embodiments of FIGS. 5-10, 11, 12, 14, and 15. Moreover, the suction openings 592 gradually increase in length from the intermediate section 564 to first and second end sections 568 and 572, and the distance between the suction openings 592 (from the outer edge of a first opening to the inner edge of the next opening) generally decreases.

Various other patterns of suction openings may instead be used. For instance, the suction openings may be only on the first and second end sections (on any surface of the body), with limited or no suction openings in the intermediate section. The size and pattern of suction openings can be optimized to help create a substantially even distribution of fluid suction flow into the manifold. It should be appreciated that the size and pattern of suction openings will depend upon various factors, such as the size and geometry of the manifold body, the fluid volume within the vessel, the flow rate required by the retort configuration, etc.

In that regard, the size and geometry of the manifold body may be varied to help distribute the fluid suction flow (and therefore the fluid level) substantially evenly along the length of the vessel. Referring again to FIGS. 5-10, the cross-sectional size and shape of the body 62 may be smaller in sections of the body 62 farther away from the outlet opening 98 (i.e., the suction point). In some configurations, if the manifold body was substantially the same cross-sectional shape and size along its length, the pressure drop across the manifold would be greater in the middle of the manifold (near the suction point) than near the end of the manifold (away from the suction point). To prevent this pressure drop differential, the cross-sectional size and shape of the body 62 can be smaller in size near the first and second end sections 68 and 72 than in the intermediate section 64.

In the embodiment depicted in FIGS. 5-10, the first and second end sections 68 and 72 (away from the outlet opening 98) may be smaller in height than the intermediate section 64 (near the outlet opening 98). Preferably, the first and second end sections 68 and 72 are sufficiently smaller in height to help effectuate a substantially even pressure drop across the length of the manifold 54. When the first and second end sections 68 and 72 are smaller in vertical height (than the intermediate section 64), less pressure drop is required for fluid to flow into the first and second end sections 68 and 72 than would otherwise be required if the first and second end sections 68 and 72 were the same vertical height as the intermediate section 64. With a smaller height, the pressure drop at the first and second end sections 68 and 72 becomes more like the pressure drop at suction openings 92 in the intermediate section 64, resulting in a substantially even flow rate of fluid into the manifold 54. It should be noted that in the embodiment shown in FIGS. 5-10, the first and second end sections 68 and 72 are also sufficiently smaller in width to help effectuate a substantially even pressure drop across the length of the manifold 54.

In some embodiments, the body of the manifold may taper in height (and optionally width) as it extends from the intermediate section to the first and second end sections. Such a configuration is shown in the alternate embodiments of FIGS. 12-13 and 16-18, wherein like parts have been numbered as in FIGS. 5-10 but in the '300 series and '500 series, respectively. The reduced cross-sectional size at the ends of the manifold help create a more even pressure drop along the length of the manifold 54, resulting in a substantially even flow rate of fluid into the manifold.

Referring specifically to FIGS. 12-13, the first and second end sections 368 and 372 taper in height and width as they extend away from the first and second transition sections 374 and 378. The first and second end sections 368 and 372 taper in height until the height at the distal ends of the manifold is almost zero (the ends substantially define a point). In this embodiment, it can be appreciated that the suction opening size near the manifold ends may also increase to accommodate the significantly tapered height.

In the embodiment shown in FIGS. 16-18, the body 562 of the manifold 564 gradually tapers in width and height (and gently changes direction) as it extends from the intermediate section 564, having the central outlet openings 598 centered therein, toward the first and second end sections 568 and 572. To match this gradually tapered shape, the suction openings 592 gradually increase in length from first and second inner sections 560 and 564 to first and second end sections 568 and 572, and the distance between the suction openings 592 (from the outer edge of a first opening to the inner edge of the next opening) generally decreases.

The combined effect of the pattern and size of the suction openings and the smaller cross-sectional size (and particularly the height) of the first and second end sections (in comparison to the larger cross-sectional size of the intermediate section) helps create a substantially even pressure drop across the length of the manifold. With the substantially even pressure drop across the length of the manifold, the flow of pooled fluid into the manifold through the suction openings is substantially even.

In that regard, the pattern and size of the suction openings, the cross-sectional size and geometry of one or more sections of the body, and the positioning of the manifold within or relative to the vessel may be altered to optimize the manifold for the intended retort system having a selected flow rate, load requirements, etc. For instance, the size and pattern of suction openings, the cross-sectional size and geometry of one or more sections of the body, and the positioning of the manifold within the vessel will be different for a retort system having a single suction point (like the retort system 40 depicted) versus a retort system having two or more suction points.

It should also be appreciated that two or more manifolds may be used within a retort system. For instance, in the alternative embodiment depicted in FIG. 20, wherein like parts are numbered as in FIGS. 4-10 except in the '700 series, the fluid suction system 740 includes first and second manifolds 754A and 754B extending along a length of the vessel 714. In this configuration, each manifold 754A and 754B could include one or more outlets 758A and 758B, respectively. Moreover, the manifolds 754A and 754B could be constructed similar to any of the manifolds described above with reference to FIGS. 4-19.

The manifold(s) of the fluid suction system may also be disposed in a different position or location relative to the vessel of the retort system. For instance, the manifold may be placed exterior of the vessel. In the alternative embodiment shown in FIG. 21, wherein like parts to those in FIGS. 4-10 are numbered with like numerals except in the '800 series, the manifold 862 is positioned outside the bottom of the vessel 814. In such a configuration, the vessel 814 may include a plurality of outlet openings (not labeled) that are in fluid communication with inlets 898A-898K defined in the body 862 of the manifold 854. The pooled fluid could flow through the vessel outlet openings, into the corresponding inlets 898A-898K of the manifold 854, and thereafter into the outlet pipe 858 connected to the pump system.

Each of the inlets 898A-898K may include a valve 870 (such as a ball valve or other suitable valve) configured to selectively control the amount of flow through the opening. For instance, the valves 870 may be used to create larger outlet/inlet openings near the ends of the vessel in comparison to the outlet/inlet openings near the middle of the vessel. Any other suitable structure or configuration may be used to selectively control the flow of fluid out of the vessel through one or more openings. It should also be noted that although the manifold 854 and vessel 814 are shown having eleven outlet/inlet openings, many more openings, such as fifty or more may be needed to effectuate a substantially even fluid level across the length of the vessel. Accordingly, it can be appreciated that the embodiment shown in FIG. 21 may not always be the most optimal.

Moreover, the retort system 840 would require additional fluid inside the vessel 814 in comparison to other embodiments, such as those shown in FIGS. 4-20. More specifically, with the manifold 854 positioned exterior of the vessel 814, additional fluid would need to be added to the vessel 814 to compensate for the volume that would normally be taken up by the manifold itself. However, in this embodiment, as well as in any other embodiment, interior "volume fillers" or other flow-altering structure could be added to the interior of the vessel as needed.

In another configuration, the manifold may be disposed within a trough extending from the bottom interior of the vessel (not shown). The trough could extend along only a portion of the vessel length, with the fluid potentially only at a level inside the trough (and not reaching the bottom interior of the vessel). In such a configuration, the fluid level would extend only along the trough (i.e., along only a portion of the length of the vessel) rather than along the entire length of the vessel.

In the exemplary fluid suction system embodiments described and illustrated herein, the optimized manifold will distribute the fluid suction flow (and therefore the fluid level) substantially evenly along the length of the vessel, allowing a lower volume of recirculated fluid to be used without having to lower the flow rate within the retort system. An optimized fluid suction system is illustrated schematically in FIG. 3. The schematic view illustrates the intended and overall effect of the optimized manifold 54 of the fluid suction system 44 shown in FIGS. 4-10; however, it should be appreciated that similar effects would result from at least the embodiments shown in FIGS. 11-18.

Figure 2:
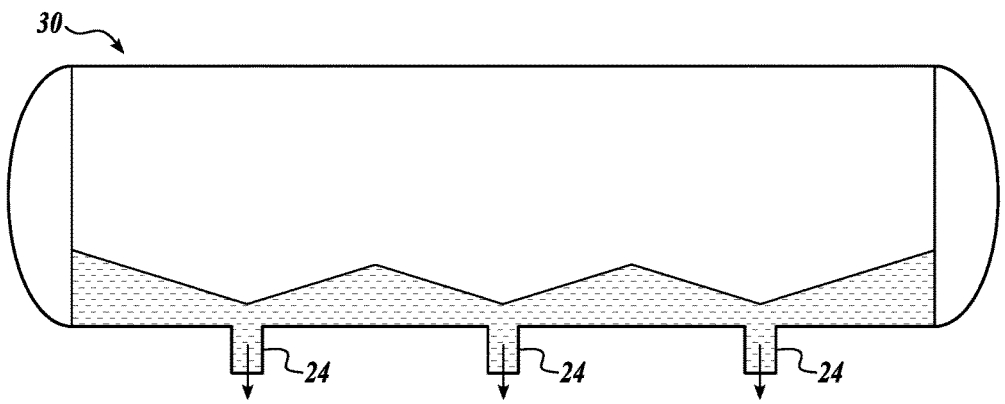
FIG. 2 is a schematic view of a second prior art retort having a plurality of suction points and having a second significant gradient effect.
Figure 3:
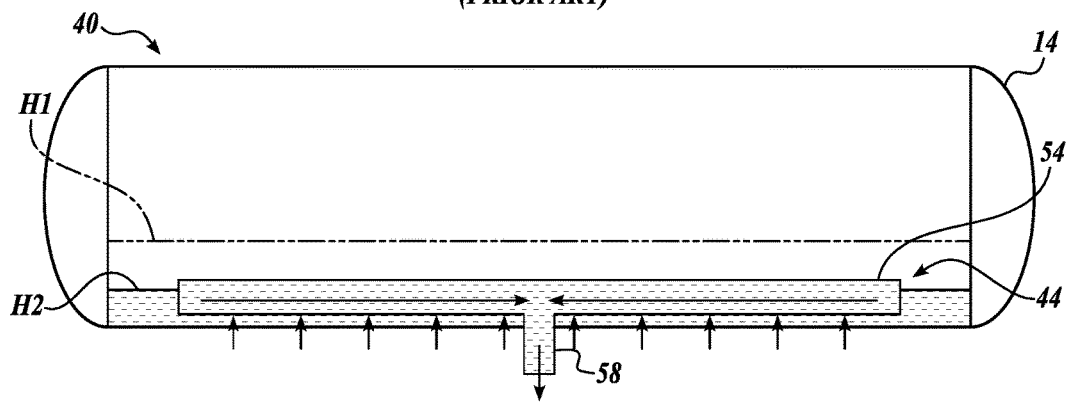
FIG. 3 is a schematic view of a fluid suction system formed in accordance with a first exemplary embodiment of the present disclosure, wherein the fluid level is substantially even along the length of the retort.

As shown in FIG. 3, the manifold 54 of the fluid suction system 44 is designed to substantially reduce or eliminate the gradient effect during recirculation, allowing the fluid level to be reduced to the minimum volume required to operate the retort process with the selected flow rate. As can be seen in FIG. 3, the fluid level H1 is a typical level (with the pump turned off) needed to recirculate the fluid within a retort having a prior art suction system to account for the fluid gradient at the selected flow rate (as shown in FIGS. 1 and 2). If, in the prior art systems, the fluid is not at about the level H1 with the pump turned off, the fluid at the suction points would fall below a threshold level when the pump is turned on and would cause air entrainment or cavitation within the pump during recirculation.

In a retort system 40 having a fluid suction system 44 formed in accordance with the present disclosure, the volume of fluid may be reduced to a level H2 with the pump turned off since the fluid level is substantially even along the length of the vessel 14 during recirculation, and the fluid does not fall below a threshold level near the suction point 58. Rather, the manifold 54 is designed to approximate an infinite amount of suction points; and therefore, the fluid surface will approach a substantially constant, even level H2 during recirculation at the selected flow rate.

In the depicted configuration, the fluid surface level H2 would be only slightly lower when the pump is on. However, in certain alternative retort configurations, the fluid level H2 would be higher with the pump off to account for the fluid volume within the retort that fills the various pipes leading to the spray nozzles, etc. Such additional volume would also affect the fluid level H1. In other words, the representative difference in fluid levels of a retort having a prior art suction system and a retort having a suction system formed in accordance with the present disclosure would be substantially the same as that illustrated in FIG. 3. Accordingly, the description and illustrations provided herein should not be seen as limiting.

EXPERIMENT

An experiment was conducted to measure the level of fluid within a vessel having a fluid suction system formed in accordance with an exemplary embodiment of the present disclosure. The fluid level was measured at various suction openings along the manifold with a predetermined outlet flow rate to determine if a substantially even level of fluid resulted within the vessel.

Figure 22:
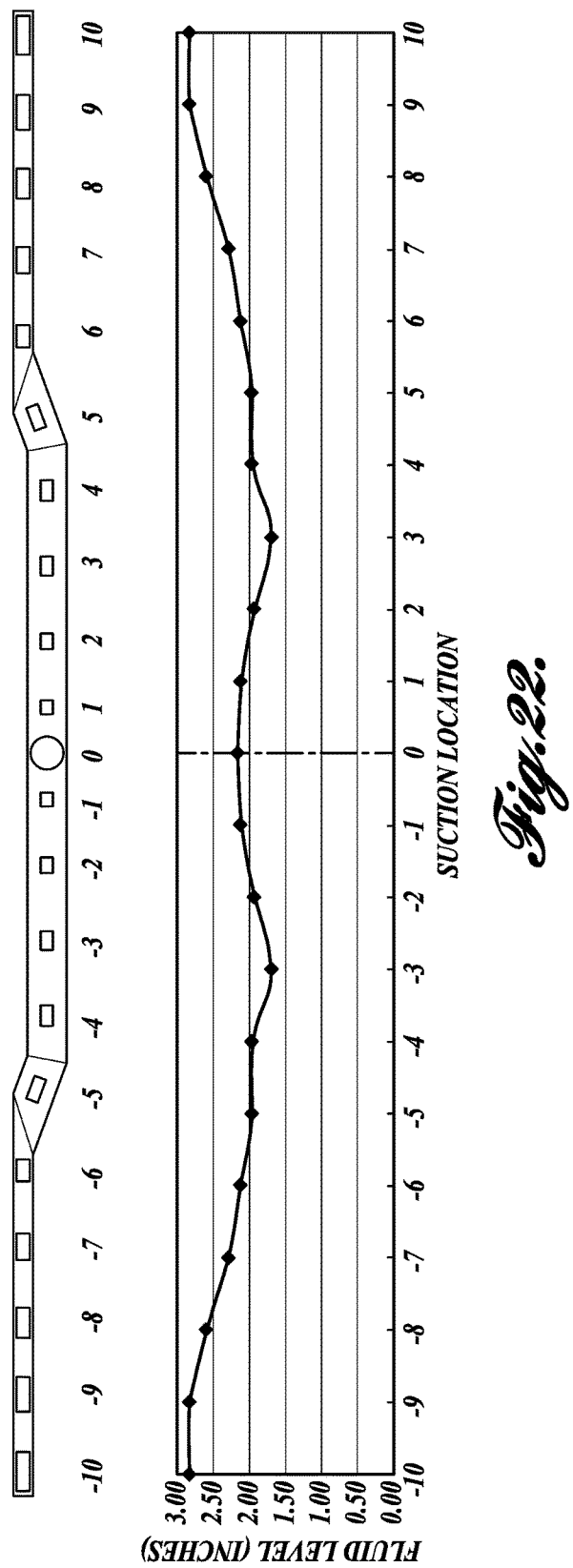
FIG. 22 is a graphical depiction of fluid level within a retort vessel during operation having a fluid suction system formed in accordance with an exemplary embodiment of the present disclosure.

The experiment was conducted with a 1400 mm diameter spray retort available from JBT Corporation of Chicago, Ill., and a prototype manifold similar in cross-sectional shape and size to the manifold 254 shown in FIG. 11. FIG. 22 depicts a top view of the prototype manifold used in the experiment, as well as a corresponding graph showing the fluid surface level inside the vessel at the various suction openings of the manifold during the test. The manifold included ten suction openings (openings 1 through 10) on a first side of the manifold extending from the outlet opening to the first end, and ten suction openings (openings −1 through −10) on a second side of the manifold extending from the outlet opening to the second end.

All of the suction openings were substantially the same width, 50 mm. However, the length of the suction openings increased from suction opening 1 to suction opening 10 and from suction opening −1 to suction opening −10, as indicated in the "Slot Length" column of Table 1. It should be noted that only suction openings 1 to 10 are included in Table 1, and suction openings −1 to −10 have substantially identical levels as the corresponding suction points 1 to 10 and are therefore not included in Table 1. Each suction opening was covered with a perforated plate/screen having a total open area of about 35%. The total system flow during the experiment was 225.5 m³/hr. The fluid used during the experiment was water, and the initial or "minimum" water level within the vessel (with the pump off) was about 62-76 mm, or about 2.5-3 inches, which is significantly lower than the minimum water level needed in prior art retort systems (which may be, for example, about 127 mm or 5 inches). It can be appreciated that the minimum water level within the vessel defines the minimum volume of water within the vessel, which can be easily calculated based on retort size and geometry.

The water surface level within the vessel was recorded at each suction opening (location) and tabulated in TABLE 1 below, which is also depicted graphically in the charts shown in FIGS. 22 and 23. The "head" is equivalent to the distance between the water surface level and the bottom of the manifold at the suction opening location, and the "water level height" is equivalent to the distance between the water surface level and the bottom of the vessel at the suction opening location.

TABLE 1

| Suction Opening Location | Suction Opening Length (mm) | Total Area of Suction Opening (mm²) | Suction Opening Area with Perforated Plate/Screen (mm²) | Head (mm) | Water Level Height (mm) | Water Level Height (in) |
| --- | --- | --- | --- | --- | --- | --- |
| 1 | 55 | 2750 | 968 | 24 | 54 | 2.13 |
| 2 | 65 | 3250 | 1144 | 19 | 49 | 1.93 |
| 3 | 75 | 3750 | 1320 | 13 | 43 | 1.69 |
| 4 | 80 | 4000 | 1408 | 20 | 50 | 1.97 |
| 5 | 95 | 4750 | 1672 | 20 | 50 | 1.97 |
| 6 | 90 | 4500 | 1584 | 24 | 54 | 2.13 |
| 7 | 105 | 5250 | 1848 | 28 | 58 | 2.28 |
| 8 | 120 | 6000 | 2112 | 36 | 66 | 2.60 |
| 9 | 140 | 7000 | 2464 | 42 | 72 | 2.83 |
| 10 | 160 | 8000 | 2816 | 42 | 72 | 2.83 |

As can be seen in the graph of FIG. 22, the water surface level in the retort was substantially the same along the length of the vessel (at each suction opening location) when there was a selected flow rate (225.5 m³/hr) through the manifold. It should also be noted that with the pump on, the water level at each suction opening was only slightly higher or lower than the water level with the pump off. The variation in water surface level during the experiment (with the pump on) was between about 1.69 inches at the lowest point and about 2.83 inches at the highest point (about 1.14 inches between the highest and lowest points). Such a small variation in water surface level height was interpreted to mean that the manifold sustained a substantially even or flat water surface level along the length of the vessel during recirculation. Such an interpretation is made since the slight variations in water surface level height (including wave or ripple effects) did not cause any air entrainment or cavitation within the pump during with the selected minimum water level (62 mm) and selected flow rate (225.5 m³/hr). In other words, the function and purpose of the tested fluid suction system was achieved.

In further aspects of the experiment, a comparison of the water surface level measured during the experiment to the water surface level of a prior art or standard water suction system (in a system having substantially the same flow rate) is shown in the graph of FIG. 23. As can be seen in the graph, the water surface level in the retort with the manifold tested in the experiment is substantially flat or even (solid line) in comparison to the significant gradient effect of the standard prior art suction system (dashed line). The graph in FIG. 23 can further be used to appreciate the water saved by using the fluid suction system of the present disclosure. More specifically, the shaded area between the solid and dashed line represents the volume of water saved by using the fluid suction system of the present disclosure.

In that regard, the inventors have calculated that in a 1400 mm diameter spray retort using a fluid suction system in accordance with the present disclosure, as done in this experiment, the volume of the pooled fluid at the bottom of the retort was about 37% less in comparison to a similar retort using a prior art suction system. This reduction in pooled fluid provides at least the following benefits:

Less water has to be purchased to fill the retort with the pooled water.
Energy is conserved by not having to heat as much water.
Energy is conserved and water usage is lowered by not having to replace condensate at the boiler ('make-up' water).

For a larger 1800 mm diameter retort, the volume difference between a prior art fluid system and a fluid suction system formed in accordance with the present disclosure can be easily extrapolated based on retort geometry. The volume of the pooled fluid at the bottom of an 1800 mm retort using a fluid suction system of the present disclosure would be about 58% less in comparison to a similar retort using a prior art suction system. The reduction in pooled fluid in the 1800 mm retort would provide at least the three benefits identified above for the 1400 mm retort, but with greater magnitude. To illustrate the benefits another way, the inventors calculated that the annual cost savings for the 1800 mm retort using a fluid suction system of the present disclosure would be about 31,000 Euro or about $34,000 USD.

It should be appreciated that the results of the experiment and the data calculated above are exemplary only, and are not intended to limit the scope of the present disclosure. For instance, each retort tested with a fluid suction system formed in accordance with the present disclosure may have different processing requirements, constraints, geometries, etc., which may affect the functionality of the fluid suction system. Those skilled in the art will appreciate that there are many variables affecting suction flow into a manifold. For instance, the size of the suction openings, the pattern and location of the suction openings, the cross-sectional shape and size of the manifold along the length of the flow path, the manifold transitions (smooth or disjointed) of cross-sectional shape and size along the flow path, the vertical height of the manifold along the manifold length, etc., must be taken into account in order to achieve the desired substantially even suction flow along the length of the manifold. Accordingly, the descriptions and illustrations provided herein should not be seen as limiting the scope of the present disclosure.

While illustrative embodiments have been illustrated and described, it will be appreciated that various changes can be made therein without departing from the spirit and scope of the invention.

The embodiments of the invention in which an exclusive property or privilege is claimed are defined as follows:

1. A fluid suction system for a first retort having a vessel with a vessel length, pooled fluid at a bottom of the vessel defining a fluid surface level, and a retort vessel outlet placing the vessel in fluid communication with a pump, the fluid suction system comprising an elongated manifold having a length for placement along the bottom of the vessel in fluid communication with the retort vessel outlet, wherein the pooled fluid flows into and through the elongated manifold when the pooled fluid is suctioned by the pump, and wherein the fluid surface level of the pooled fluid inside the vessel remains substantially even along the length of the elongated manifold as the pooled fluid is suctioned by the pump at a selected flow rate that is substantially higher than what gravity would otherwise provide to remove the pooled fluid from the bottom of the vessel, wherein the elongated manifold has a hollow body with a length, wherein the body includes an intermediate section and first and second end sections, a body outlet opening in fluid communication with the retort vessel outlet, and a plurality of suction openings defined along at least a portion of the length of the body that are in fluid communication with the pooled fluid at the bottom of the vessel, and wherein at least one of a cross-sectional size of the elongated body decreases as it extends from the intermediate section toward both the first and second ends sections and the suction openings in the body are smaller in size near the body outlet opening in comparison to the suction openings near the first and second end sections such that substantially even suction flow into the body results along the length of the elongated manifold as the pooled fluid is suctioned by the pump.

2. The system of claim 1, wherein the body has a bottom surface, and wherein the suction openings are defined in the bottom surface.

3. The system of claim 2, wherein the bottom surface of the body is spaced from a bottom surface of the vessel such that the pooled fluid may flow between the body and the vessel.

4. The system of claim 1, wherein the suction openings in the body are spaced farther apart near the body outlet opening than the suction openings near the first and second end sections.

5. The system of claim 1, wherein the first and second end sections taper in at least height as they extend from the intermediate section.

6. The system of claim 1, wherein the body has at least one side surface, and wherein the suction openings are defined in the at least one side surface.

7. The system of claim 1, wherein the elongated manifold is placed within the interior of the vessel.

8. The system of claim 1, wherein the selected flow rate is sufficiently high to cause a significant gradient effect in a second retort having an outlet with no elongated manifold.

9. The system of claim 8, wherein the pooled fluid is at a minimum fluid volume within the vessel to flow into and through the elongated manifold when the pooled fluid is suctioned by the pump without causing any air entrainment or cavitation within the pump.

10. The system of claim 1, wherein a flow of the pooled fluid into each of the suction openings is substantially even.

11. The system of claim 1, wherein a variation in fluid surface level of the pooled fluid is within a range of about 1.14 inches between a highest water level point and a lowest water level point.

12. The system of claim 1, wherein the first retort is a 1800 mm diameter retort, the selected flow rate is around 1500 gallons per minute, and wherein the first retort is a 1400 mm diameter retort, the selected flow rate is around 225 m$^3$/hr.

13. A fluid retort system, comprising:
a vessel with a vessel length;
pooled fluid at a bottom of the vessel defining a fluid surface level;
a retort vessel outlet placing the vessel in fluid communication with a pump; and
a fluid suction system comprising an elongated manifold having a length and configured for placement along the bottom of the vessel in fluid communication with the retort vessel outlet, wherein the pooled fluid flows into and through the manifold when the pooled fluid is suctioned by the pump, and wherein the fluid surface level of the pooled fluid remains substantially even along the length of the elongated manifold as the pooled fluid inside the vessel is suctioned by the pump at a selected flow rate that is substantially higher than what gravity would otherwise provide to remove the pooled fluid from the bottom of the vessel, wherein the elongated manifold has a hollow body with a length, wherein the body includes an intermediate section and first and second end sections, a body outlet opening in fluid communication with the retort vessel outlet, and a plurality of suction openings defined along at least a portion of the length of the body that are in fluid communication with the pooled fluid at the bottom of the vessel, and wherein at least one of a cross-sectional size of the elongated body decreases as it extends from the intermediate section toward both the first and second ends sections and the suction openings in the body are smaller in size near the body outlet opening in comparison to the suction openings near the first and second end sections such that substantially even suction flow into the body results along the length of the elongated manifold as the pooled fluid is suctioned by the pump.

14. A fluid suction system for a first retort having a vessel with a vessel length, pooled fluid at a bottom of the vessel defining a fluid surface level, the fluid suction system comprising an elongated manifold having a length for placement along a bottom of the vessel, wherein the pooled fluid flows into and through the elongated manifold when the pooled fluid is suctioned by a pump, and wherein the fluid surface level of the pooled fluid inside the vessel remains substantially even along the length of the elongated manifold as the pooled fluid is suctioned by the pump at a selected flow rate that is substantially higher than what gravity would otherwise provide to remove the pooled fluid from the bottom of the vessel, wherein the elongated manifold has a hollow body with a length, wherein the body includes an intermediate section and at least one end section and a plurality of suction openings defined along at least a portion of the length of the body that are in fluid communication with the pooled fluid at the bottom of the vessel, and wherein at least one of a cross-sectional size of the elongated body decreases as it extends from the intermediate section toward the at least one end section and the suction openings in the body are smaller in size near the intermediate section in comparison to the suction openings near the at least one end section such that substantially even suction flow into the body results along the length of the elongated manifold as the pooled fluid is suctioned by the pump.

* * * * *